United States Patent
Schnörwangen et al.

(10) Patent No.: US 8,925,867 B2
(45) Date of Patent: Jan. 6, 2015

(54) MODULAR ADAPTIVE ELECTRICAL FREIGHT LOADING SYSTEM

(75) Inventors: Bernd Schnörwangen, Syke-Gessel (DE); Volker Hasbach, Oldenburg (DE)

(73) Assignee: Airbus Operations GmbH (DE)

( * ) Notice: Subject to any disclaimer, the term of this patent is extended or adjusted under 35 U.S.C. 154(b) by 175 days.

(21) Appl. No.: 13/148,821

(22) PCT Filed: Feb. 4, 2010

(86) PCT No.: PCT/EP2010/051385
§ 371 (c)(1),
(2), (4) Date: Aug. 10, 2011

(87) PCT Pub. No.: WO2010/092000
PCT Pub. Date: Aug. 19, 2010

(65) Prior Publication Data
US 2011/0313564 A1    Dec. 22, 2011

Related U.S. Application Data (60) Provisional application No. 61/151,257, filed on Feb. 10, 2009.

(30) Foreign Application Priority Data

Feb. 10, 2009    (DE) .................. 10 2009 008 187

(51) Int. Cl.
*B64F 1/32*    (2006.01)
*B64D 9/00*    (2006.01)
*B63B 27/00*    (2006.01)
*B63B 27/22*    (2006.01)

(52) U.S. Cl.
CPC . *B63B 27/00* (2013.01); *B64D 9/00* (2013.01); *B63B 27/22* (2013.01); *Y02T 50/46* (2013.01)
USPC ........................................ 244/137.1

(58) Field of Classification Search
USPC .......................................... 244/137.1, 118.1
See application file for complete search history.

(56) References Cited

U.S. PATENT DOCUMENTS

| | | | |
|---|---|---|---|
| 4,446,524 A | 5/1984 | Wendt | |
| 6,328,154 B1 * | 12/2001 | Huber | 198/782 |
| 7,198,227 B2 | 4/2007 | Olin et al. | |
| 7,604,204 B2 | 10/2009 | Jacobsen et al. | |
| 7,974,775 B1 * | 7/2011 | Masson | 701/528 |
| 8,220,750 B2 * | 7/2012 | Hettwer | 244/137.1 |
| 2006/0186271 A1 | 8/2006 | Jacobsen et al. | |

(Continued)

FOREIGN PATENT DOCUMENTS

| | | |
|---|---|---|
| CA | 2315068 A1 | 7/1999 |
| DE | 19756875 | 7/1999 |

(Continued)

*Primary Examiner* — Timothy D Collins
*Assistant Examiner* — Richard R Green
(74) *Attorney, Agent, or Firm* — Lerner, David, Littenberg, Krumholz & Mentlik, LLP (57) ABSTRACT

A cargo loading system for a means of transport with a power drive unit 201 for moving cargo in a cargo hold of a means of transport and with an operational control unit. The operational control unit is designed for controlling the entire movement of the cargo by means of the power drive unit.

14 Claims, 4 Drawing Sheets

(56) References Cited

U.S. PATENT DOCUMENTS

| | | |
|---|---|---|
| 2009/0028677 A1 | 1/2009 | Williams et al. |
| 2009/0121084 A1 | 5/2009 | Hettwer |
| 2009/0121085 A1 | 5/2009 | Hettwer |

FOREIGN PATENT DOCUMENTS

| | | |
|---|---|---|
| DE | 19947739 A1 | 4/2001 |
| DE | 10338704 | 3/2005 |
| DE | 102005026898 | 1/2006 |
| DE | 102005008443 | 9/2006 |
| DE | 102008052432 | 5/2009 |
| DE | 102008052468 | 5/2009 |
| GB | 2443554 | 5/2008 |
| WO | 0128894 | 4/2001 |
| WO | 2008091287 | 7/2008 |

* cited by examiner

FIG. 5

MODULAR ADAPTIVE ELECTRICAL FREIGHT LOADING SYSTEM

CROSS-REFERENCE TO RELATED APPLICATIONS

This application is a national phase entry under 35 U.S.C. §371 of International Application No. PCT/EP2010/051385, filed Feb. 4, 2010, published in German, which claims the benefit of the filing date of German Patent Application No. 10 2009 008 187.9, filed Feb. 10, 2009 and of U.S. Provisional Patent Application No. 61/151,257 filed Feb. 10, 2009, the entire disclosures of which are hereby incorporated herein by reference.

FIELD OF THE INVENTION

The invention pertains to loading a cargo hold of a means of transport with cargo. The invention specifically pertains to a cargo loading system for an aircraft. The invention furthermore pertains to a means of transport, as well as an aircraft with a cargo loading system and a method for loading a cargo hold of a means of transport with cargo.

BACKGROUND OF THE INVENTION

Main deck (Maindeck=MD) cargo loading systems can be used for loading a cargo hold of an aircraft with cargo, wherein several operating panels respectively are permanently installed on the left side and the right side in the cargo hold in order to operate the system. In a cargo loading system of this type, the position of the operating personnel is fixed, i.e., the operation of the individual panels or operating units is related to certain storage positions in the cargo hold. Such an MD cargo loading system may comprise several different operating units for loading the cargo hold of an aircraft.

A small, specifically defined space for the operating personnel is provided at the respective loading position during the loading and unloading process in order to operate the panels that are arranged at a defined position in the cargo hold. US 2006186 271 and DE 10 2005 008 443 disclose a loading device for semi-automatically loading and unloading a cargo hold of a means of transport, particularly a cargo hold of an aircraft.

SUMMARY OF THE INVENTION

An objective of the invention can be seen in allowing a safe and improved loading of a means of transport with cargo.

A cargo loading system, a means of transport with a cargo loading system and a method with a cargo loading system according to the characteristics of the independent claims are disclosed. Additional developments of the invention are embodied by the dependent claims.

According to an exemplary embodiment of the invention, a cargo loading system for a means of transport with a power drive unit for moving cargo in a cargo hold of a means of transport and an operational control unit is proposed. The operational control unit is designed for controlling the entire movement of the cargo by means of the power drive unit.

Such a cargo loading system improves the flexibility of the loading personnel that operates the operational control unit in the cargo compartment (Cargo Compartment=CC) of a cargo hold because it is possible to eliminate several different operating units, as well as cargo control boxes for sectors, in order to operate and control power drive units that transport cargo.

In a cargo loading system of this type, it is furthermore possible to lower the maintenance costs due to the reduction of the operating units for power drive units that transport cargo such as the local operating units, control boxes and the wiring.

In addition, the time required for loading and unloading the cargo can be reduced with an above-described cargo loading system because all cargo loading processes from loading to unloading the cargo can be realized with one operational control unit.

In such a loading system, the wiring is furthermore reduced due to the combination of many different operating units into one operational control unit such that a weight reduction can also be realized.

A loading system of this type also makes it possible to improve the flexibility of the loading personnel because the loading procedure does not have to be interrupted in order to change position. The loading personnel can move the cargo up to its final position and promptly interlock the cargo. Since the number of permanently installed operating units is reduced to one portable and wireless operational control unit, the mobility of the loading personnel is improved and the previously required wiring expenditures with respect to existing operational control units and the energy supply of the drive are reduced such that a weight reduction is achieved.

Such a cargo loading system of the above-described type furthermore makes it possible to flexibly configure the loading system due to the authentication of the operational control unit and therefore the allocation to the respective cargo compartment (Cargo Compartment) of the cargo hold and the aircraft to be loaded.

According to another exemplary embodiment of the invention, the cargo loading system furthermore features a plurality of power drive units, wherein the operational control unit is designed for controlling all or several specific power drive units.

According to another exemplary embodiment of the invention, the operational control unit is movable relative to the cargo hold.

Such a freely movable operational control unit improves the flexibility of the operating personnel because it enables the operating personnel to freely move about anywhere in the cargo hold and it is possible to operate the power drive units for moving the cargo from anywhere.

According to another exemplary embodiment of the invention, the operational control unit is designed for wirelessly transmitting commands for controlling the power drive unit to the power drive unit.

According to another exemplary embodiment of the invention, the operational control unit is designed for wirelessly transmitting commands for controlling the power drive unit to a control unit.

According to another exemplary embodiment of the invention, the operational control unit is designed for wirelessly transmitting commands for controlling the power drive unit to a configuration unit.

Such a wireless transmission of commands makes it possible to reduce the wiring within the cargo hold and therefore the weight of the means of transport.

The aforementioned transmission of commands also may take place in a non-wireless fashion, but rather, for example, via corresponding lines.

According to another exemplary embodiment of the invention, a cargo loading system with a loading unit is proposed, wherein the operational control unit is realized in such a way that it configures itself for the cargo hold by means of the loading unit. In this respect, the loading unit may inform the operational control unit, for example, of the operating area (aircraft, cargo hold, left track/right track/entry area at cargo door), for which the control unit is responsible.

In this case, the operational control unit of such a cargo loading system may be coupled to the loading unit for configuring the operational control unit for a certain means of transport with a certain cargo to be loaded. The coupling may be realized, for example, in the form of an inductive coupling, a plug connection, a wireless coupling such as, for example, with Bluetooth technology or a magnetic coupling. In this case, the data transmission can be realized via control lines by means of "Handshaking" (a hardware method for controlling the data flow). The operational control unit may be configured for use in several means of transport.

The loading unit may furthermore be designed for supplying the operational control unit with power.

According to another exemplary embodiment of the invention, a cargo loading system with a configuration unit is proposed, wherein the configuration unit is designed such that it can be coupled to the operational control unit in order to configure the communication for controlling the power drive unit(s).

According to another exemplary embodiment of the invention, the cargo loading system furthermore features a control unit that is connected to the power drive unit, wherein the control unit is designed for communicating with the operational control unit in order to transmit control commands for the power drive unit.

Furthermore, a respective reduction of the wiring and the weight in the means of transport can be achieved with a central control box or control unit for the control and the interfaces with the on-board maintenance system (On Board Maintenance System=OMS), with the cargo evaluation system (Cargo Evaluation System=CES) and with the final assembly line (Final Assembly Line=FAL). For main deck applications, the local control units can be eliminated or reduced due to wireless control units.

According to another exemplary embodiment of the invention, the cargo loading system features an antenna, wherein the operational control unit is designed for transmitting information for the operation of the power drive unit to the antenna in the cargo hold, wherein the antenna is designed for forwarding this information to the control unit via the loading unit, and wherein the control unit is designed for forwarding this information to the power drive unit. The loading unit may be designed for transmitting this information to the control unit via a bus system. In this case, the transmission may be realized in a wireless fashion.

It is also possible to provide several of these antennas. The communication link between the operational control units and the control unit or the power drive unit can always be ensured with a number of correspondingly distributed antennas.

According to another exemplary embodiment of the invention, the operational control unit is designed for transmitting information for the operation of the power drive unit to the antenna in the cargo hold, wherein the antenna is designed for forwarding this information to the control unit, and wherein the control unit is designed for forwarding this information to the power drive unit.

According to another exemplary embodiment of the invention, the cargo loading system features a data bus, wherein the power drive unit is coupled to the control unit by means of the data bus.

According to another exemplary embodiment of the invention, the data bus is realized in the form of a Controller Area Network (CAN) bus. A CAN bus is an asynchronous serial bus system for networking control devices in means of transport in order to reduce wiring harnesses and thusly lower the weight.

Such a cargo loading system with a data bus makes it possible to arbitrarily expand and configure the system because the power drive units are connected to the data bus and the data bus is in turn connected to the control unit.

Due to the bus structure, a cargo loading system of this type may furthermore be realized such that it is not dependent on the limited pins on existing plugs. In addition, such a loading system of the above-described type can be flexibly expanded due to the connection of the power drive units via a CAN bus.

According to another exemplary embodiment of the invention, the control unit is realized in the form of a central power supply unit for the power supply of the power drive units.

Such a power supply of the power drive units is realized with 270 V DC, wherein this voltage is made available for each power drive unit (Power Drive Unit=PDU) in the control unit, e.g., from 3×115 V AC with a frequency of 400 Hz of a main power supply of the means of transport (Secondary Power Distribution Box/Solid State Power Control=SPDB/SSPC). The control unit also contains the central power factor correction (Power Factor Correction) for the entire system. The internal power supply for the control electronics of the power drive unit is realized with the 270 V DC system.

According to another exemplary embodiment of the invention, the control unit is coupled to the main power supply, the power drive unit, the loading unit and the operational control unit.

According to another exemplary embodiment of the invention, all power drive units arranged within the cargo hold can be controlled with a single operational control unit. In this case, the coupling may be realized, for example, with corresponding lines or in a wireless fashion.

According to another exemplary embodiment of the invention, the cargo hold can be divided into two halves that are arranged, for example, to both sides of a center line extending along a cargo hold floor in the longitudinal direction of the cargo hold, wherein one respective operational control unit is assigned to each power drive unit situated in the respective halves of the cargo hold. The boundary between the two areas may also extend at a different location.

According to another exemplary embodiment of the invention, the control unit is designed for alternating voltage and direct voltage on its input side and makes available a direct voltage for the power supply of the power drive units which is higher than the alternating input voltage on its output side.

According to another exemplary embodiment of the invention, a means of transport with a cargo loading system according to one of the preceding exemplary embodiments is proposed.

According to another exemplary embodiment of the invention, the means of transport is an aircraft such as, for example, an airfreighter or an airliner. However, the means of transport may also consist of a watercraft, a rail vehicle or a road vehicle.

According to another exemplary embodiment of a method, a method for loading a cargo hold of a means of transport with cargo is proposed, wherein the entire movement of the cargo in a cargo hold of a means of transport by means of a power drive unit for moving the cargo is controlled with an operational control unit. According to another exemplary embodiment of the invention, the method for loading the cargo hold of the means of transport with cargo furthermore features the following steps: transmitting a command for controlling the power drive unit(s) for moving the cargo to a control unit by means of an operational control unit; transmitting a command for controlling the power drive unit(s) for moving the cargo to the respective power drive unit(s); and moving the cargo by means of the power drive unit(s) in accordance with the transmitted command for controlling the power drive unit(s).

The individual characteristics of the different exemplary embodiments naturally can also be combined among one another such that advantageous effects that exceed the sum of the individual effects also may be achieved in some instances, namely even if they are not expressly described herein.

It should be noted, in particular, that the characteristics described above and below with reference to the cargo loading system can also be implemented in the method, the means of transport and the aircraft and vice versa.

These and other aspects of the invention are explained and elucidated with reference to the exemplary embodiments described below.

DETAILED DESCRIPTION OF EXEMPLARY EMBODIMENTS

Exemplary embodiments of the invention are described below with reference to the attached drawings.

The figures show schematic illustrations that are not true-to-scale. In the following description of the figures, identical or similar elements are identified by the same reference symbols.

Figure 1:
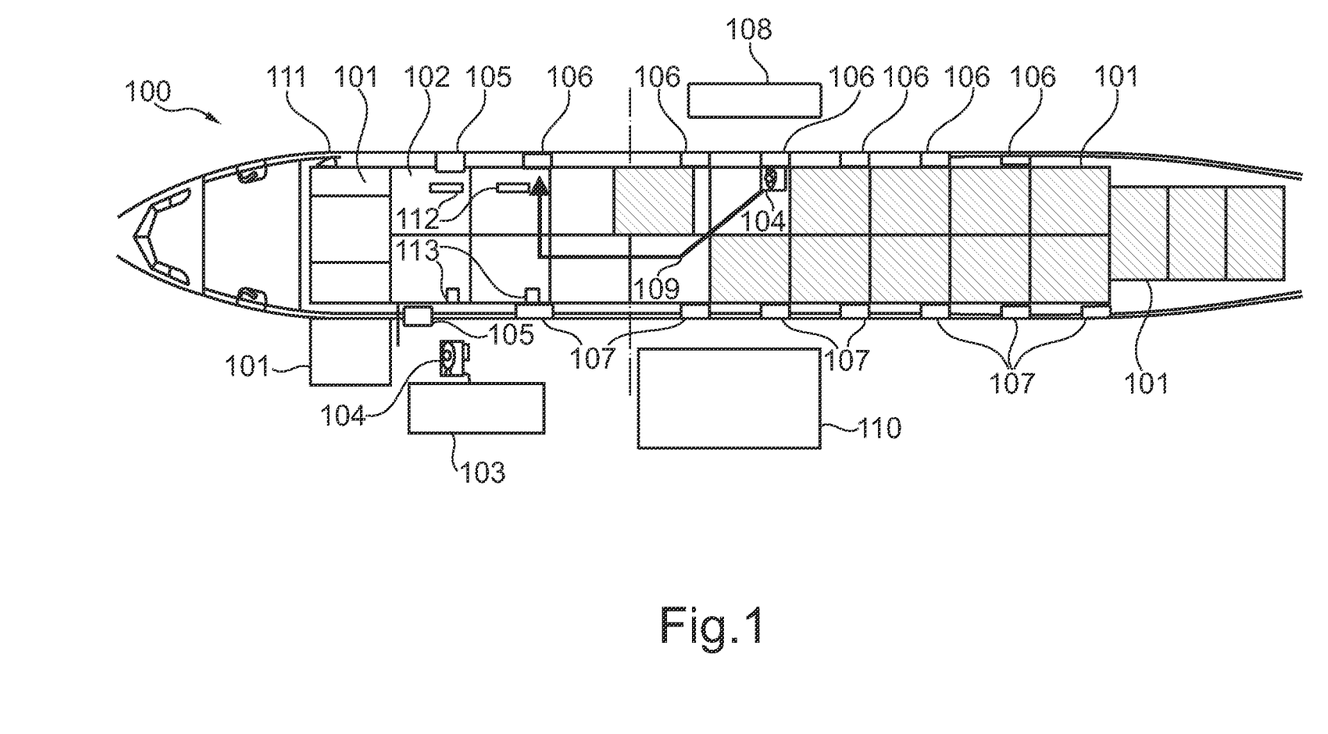
FIG. 1 shows a schematic representation of a cargo loading system for an aircraft.

FIG. 1 shows a cargo loading system for a means of transport, particularly a cargo loading system for an aircraft 100 with a cargo hold 111. Such a cargo loading system is referred to as a main deck electrical cargo loading system (Maindeck Electrical Cargo Loading System=MD ECLS) and features the following components that are realized in the form of permanently installed units:

Main operating units in the area of the cargo door 104 (MCP: Main Control Panel), an additional main operating unit for loading bulky goods 105 (RCP: Remote Control Panel), local operating units on the right side in the cargo hold 106 (LCPR: Local Control Panel Right Side), local operating units on the left side in the cargo hold 107 (LCPL: Local Control Panel Left Side), drives for transporting cargo on the cargo hold floor 112 (PDU: Power Drive Unit) and cargo control boxes (CCB: Cargo Control Box) for the sectors 113. In this configuration, about one operating unit 106, 107 is required per storage position 102. Due to a two-man loading process (operator 1, 103 and operator 2, 108), the loading with cargo units 101 takes place alternately, for example, left, right or right, left. The transfer of the cargo from the transit point to the longitudinal area of the aircraft 110 respectively takes place on the left side and the right side of the cargo hold or the aircraft. The main operating units 104 are designed, for example for controlling 109 the local operating units 106.

The drives (motors) for transporting cargo on the cargo hold floor 112 are supplied with 3×115 V AC with a frequency of 400 Hz. 28 V DC is respectively used for the voltage supply of the control units.

Figure 2:
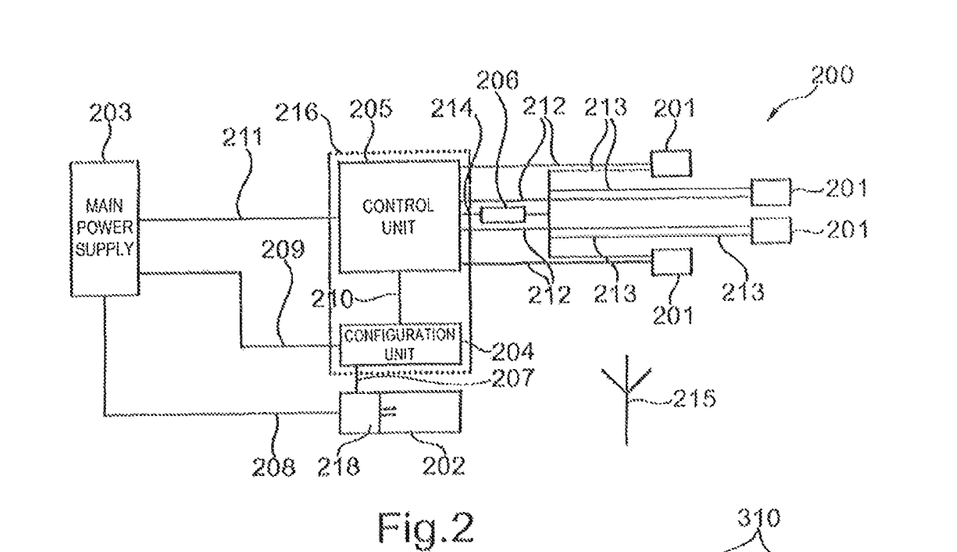
FIG. 2 shows a schematic representation of a cargo loading system for a means of transport according to an exemplary embodiment of the invention.

FIG. 2 shows a cargo loading system 200 for a means of transport with several power drive units 201 for moving cargo in a cargo hold 111 of a means of transport and with an operational control unit 202 for controlling the entire movement of the cargo by means of the power drive unit 201, as well as a main power supply for the means of transport (SPDB/SSPC) 203 and a loading unit 218, wherein the operational control unit 202 is designed in such a way that it configures itself for the cargo hold 111 by means of the loading unit 218, i.e., the loading unit 218 informs the operational control unit 202, for example, of the operating area (aircraft, cargo hold, left track/right track/entry area at cargo door), for which the control unit is responsible. The operational control unit 202 can be connected to the loading system 218 and supplied with power by the loading system 218.

The cargo loading system 200 furthermore features a configuration unit 204 that is designed such that it can be coupled to the operational control unit 202 in order to configure the communication for controlling the power drive unit 201.

The cargo loading system 200 according to FIG. 2 furthermore features a control unit 205 that is connected to the power drive unit 201, wherein the control unit is designed for communicating with the operational control unit 202 in order to transmit control commands for the power drive unit 201. In this case, the cargo loading system features several power drive units 201 that are supplied with power by the control unit 205, wherein this power is delivered to the control unit 205 by the main power supply of the means of transport (SPDB/SSPC) 203 via a line 211. The power supply of the power drive units 201 is realized via lines 212.

The cargo loading system 200 according to FIG. 2 also features at least one antenna 215, wherein the operational control unit 202 is designed for wirelessly transmitting information for the operation of the power drive unit 201 to the antenna 215 in the cargo hold 111. The antenna 215 is designed for wirelessly transmitting this information to the loading unit 218. The loading unit 218 is designed for transmitting this information to the control unit 205 via a bus system 207. The control unit 205 is designed for transmitting this information to the power drive unit 201 via a bus system 206.

The cargo loading system 200 according to FIG. 2 furthermore features a data bus 206 that is connected to the control unit 205 via a line 214. The data bus 206 is coupled to the power drive units 201 via lines 213 and signals for controlling the power drive units 201 are forwarded from the control unit 205 to the power drive units 201 via the data bus 206.

The main power supply of the means of transport 203 supplies the loading unit 218 and therefore the operational control unit 202 with power via a line 208. The main power supply 203 furthermore supplies the configuration unit 204 with power via a line 209 and the control unit 205 with power via a line 211.

The operational control unit 202 may be connected to the configuration unit 204 in order to transmit information for controlling the power drive units 201. The configuration unit 204 is connected to the control unit 205 via a line 210. The configuration unit 204 and the control unit 205 may be jointly integrated into an integrated main control unit 216.

Figure 3:
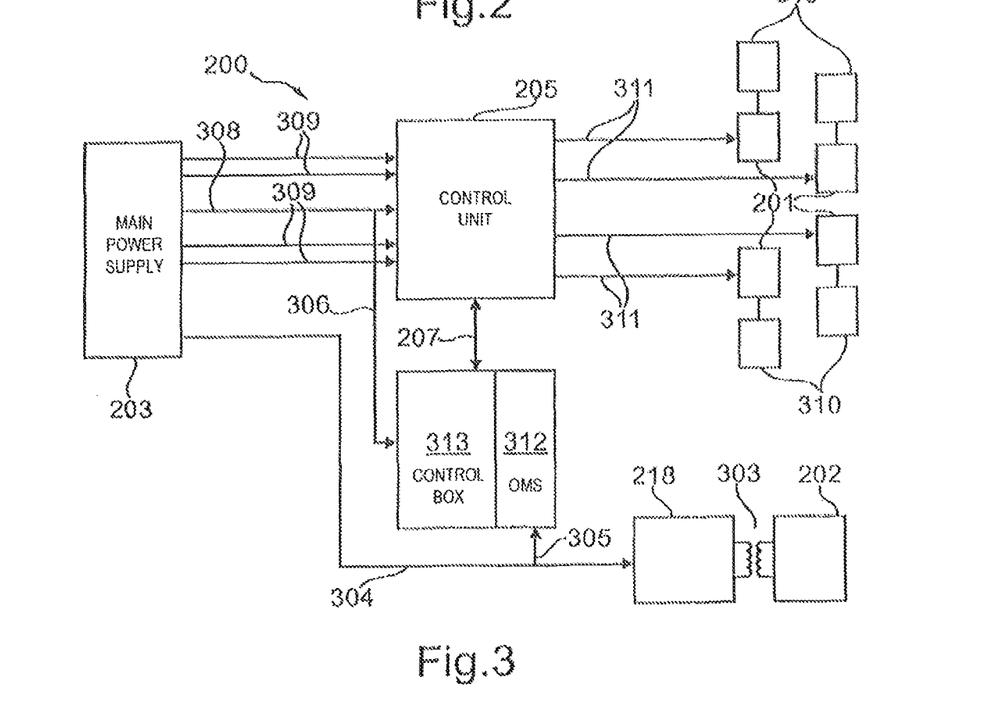
FIG. 3 shows another schematic representation of a cargo loading system for a means of transport according to an exemplary embodiment of the invention.

FIG. 3 shows a cargo loading system 200 according to another exemplary embodiment of the invention with an operational control unit 202 that is realized in the form of a wireless remote operating unit (Remote Control Panel=RCP), as well as a loading system 218 that is coupled via a coupling 303 and realized in the form of an operational loading control unit (Charging Control Panel=CCP). A power supply system (SPDB/SSPC) (203) supplies the operational control unit 202 with a voltage of 28 V DC that is actively made available in-flight via a line 304 by means of the loading unit 218.

The loading unit 218 is connected to an on-board maintenance system (On Board Maintenance System=OMS) 312 for the (active in-flight) voltage supply. The on-board maintenance system 312 is designed such that it is integrated with a control box (Control Box) 313.

The control box 313 is supplied with a voltage of 28 V DC aircraft power (Aircraft Power) by the main power supply 203 via a line 306/308. The control box 313 is connected to a control unit 205 via a line 207 that ensures the exchange of information with the control unit 205. The control box 313 is connected to the operational control unit 202 via a (not-shown) bus system, as well as to the power drive units 201, for example, in a wireless fashion, and assists in the control of the power drive units 201.

The control unit 205 is supplied with power in the form of an alternating voltage of 115 V AC aircraft power (Aircraft Power) via lines 309, as well as with power in the form of a direct voltage of 28 V DC aircraft power (Aircraft Power) by the main power supply 203 via a line 308. The control unit 205 supplies the power drive units 201 (PDU: Power Drive Units) with a voltage of 270 V DC via lines 311. Each power drive unit 201 is respectively connected to a switch (Proxy) 310 that interrupts the power supply of a power drive unit 201 after the interlocking of the cargo unit assigned to the power drive unit 201 is completed.

The function of the cargo loading system 200 according to FIG. 2 essentially corresponds to the function of the cargo loading system 200 according to FIG. 1.

Figure 4:
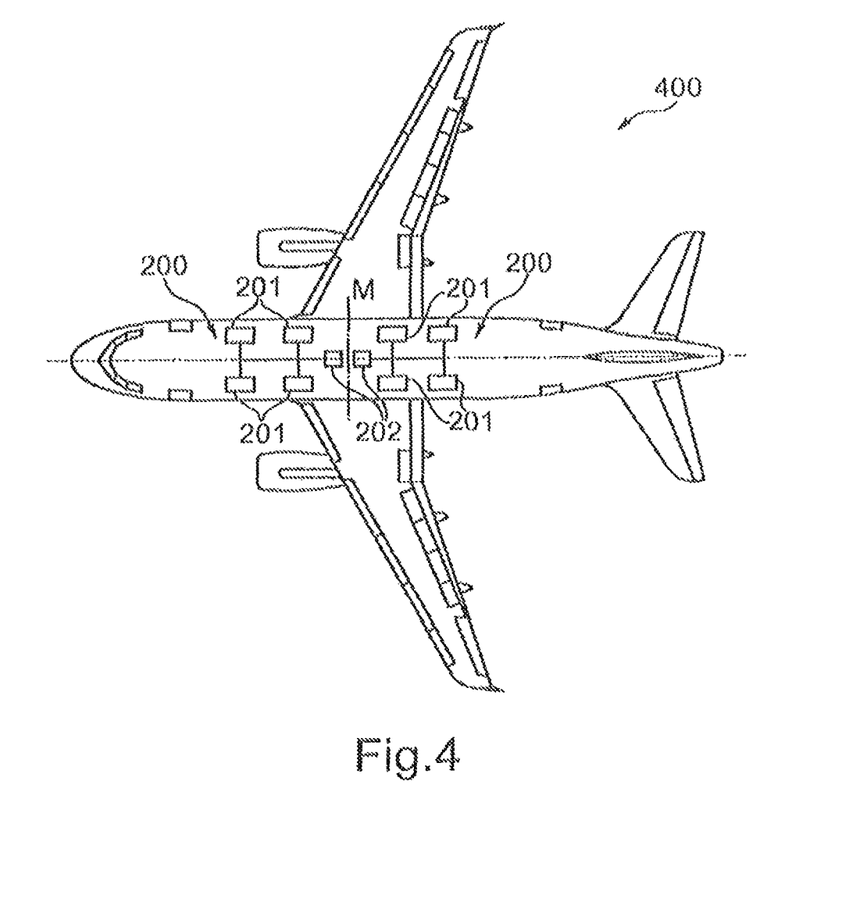
FIG. 4 shows an aircraft with a cargo loading system according to an exemplary embodiment of the invention.

FIG. 4 shows a means of transport, particularly an aircraft 400, with a cargo loading system 200 on the left side of a center line M that separates the cargo hold of the aircraft in the longitudinal direction of the cargo hold along a cargo hold floor and a cargo loading system 200 arranged on the right side of the center line M. Each of the two cargo loading systems 200 features power drive units 201 for moving cargo in a cargo hold of the aircraft 400 and one respective operational control unit 202, wherein the operational control unit 202 is designed for controlling the entire movement of the cargo on the respective side of the cargo hold separated by the center line M by means of a power drive unit 201.

Figure 5:
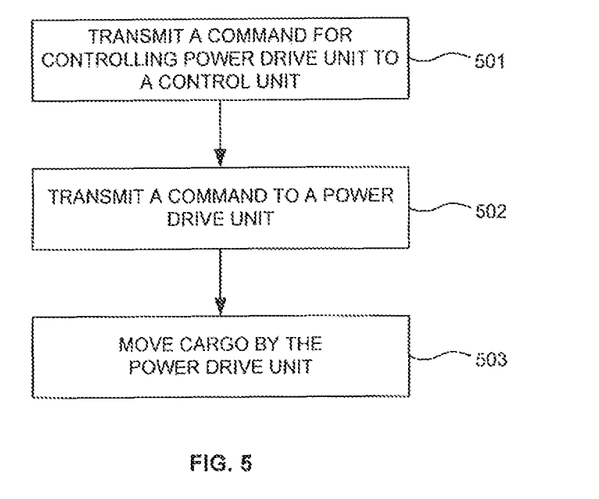
FIG. 5 shows a flow chart of a method for loading a cargo hold of a means of transport with cargo according to an exemplary embodiment of the invention.

FIG. 5 shows a flow chart of a method for loading a cargo hold of a means of transport with cargo according to an exemplary embodiment of the invention, wherein the entire movement of the cargo in a cargo hold of a means of transport by means of a power drive unit 201 for moving the cargo is controlled with an operational control unit 202, 500.

The method 500 features the following steps: in step 501, a command for controlling the power drive unit(s) 201 for moving cargo is transmitted to a control unit 205 by means of an operational control unit 202; in step 502, the command for controlling the power drive unit(s) 201 for moving the cargo is transmitted to the respective power drive unit(s) 201; ultimately, the cargo or the cargo container is moved by the power drive unit(s) 201 in accordance with the transmitted command for controlling the power drive unit(s) 201 (see step 503).

Although the invention was described with reference to exemplary embodiments, it is possible to realize various changes and modifications without deviating from the protective scope of the invention. The cargo loading systems according to the invention can be used for loading cargo on any means of transport such as vehicles, aircraft, helicopters, watercraft or rail vehicles.

As a supplement, it should be noted that "comprising" or "featuring" does not exclude other elements or steps, and that "a" or "an" does not exclude a plurality. For example, the cargo loading system therefore may feature, in particular, more than one power drive unit, more than one operational control unit, more than one loading unit, more than one control unit, more than one antenna and more than one data bus.

It should furthermore be noted that characteristics or steps that were described with reference to one of the above exemplary embodiments can also be used in combination with other characteristics or steps of other above-described exemplary embodiments. Reference symbols in the claims should not be interpreted in a restrictive sense.

The invention claimed is:

1. A cargo loading system for a means of transport, with the cargo loading system comprising:
a power drive unit for moving cargo in a cargo hold of the means of transport;
a portable operational control unit;
a control unit for controlling the power drive unit; and
a loading unit for configuring the portable operational control unit;
wherein the portable operational control unit is configured for being coupled to the loading unit;
wherein the portable operational control unit is adapted for being configured for use in different means of transport;
wherein the loading unit is configured for sending information about an operating area for which the portable operational control unit is responsible to the portable operational control unit when the portable operational control unit is coupled to the loading unit to configure the portable operational control unit for the means of transport;
wherein the portable operational control unit is configured to control the entire movement of the cargo by the power drive unit; and
wherein the portable operational control unit is configured to wirelessly transmit commands for controlling the power drive unit to the control unit.

2. The cargo loading system of claim 1, furthermore comprising:
a plurality of power drive units;
wherein the portable operational control unit is configured to control the plurality of power drive units.

3. The cargo loading system of claim 2, wherein the plurality of power drive units provided within the cargo hold are configured to be controlled with one individual portable operational control unit.

4. The cargo loading system of claim 1, wherein the portable operational control unit is movable relative to the cargo hold.

5. The cargo loading system of claim 1, wherein the portable operational control unit is configured to wirelessly transmit commands for controlling the power drive unit to the power drive unit.

6. The cargo loading system of claim 1, further comprising:
a configuration unit;
wherein the configuration unit is configured to be coupled to the portable operational control unit to configure the communication for controlling the power drive unit.

7. The cargo loading system of claim 1,
wherein the control unit is connected to the power drive unit; and wherein the control unit is configured to communicate with the portable operational control unit to transmit control commands for the power drive unit.

8. The cargo loading system of claim 1, further comprising:
at least one antenna;
wherein the portable operational control unit is configured to transmit information for the operation of the power drive unit to the at least one antenna;
wherein the at least one antenna is configured to forward the information to the loading unit;
wherein the loading unit is configured to forward the information to the control unit; and
wherein the control unit is configured to forward the information to the power drive unit.

9. The cargo loading system of claim 1, further comprising:
a data bus;
wherein the power drive unit is coupled to the control unit by the data bus.

10. The cargo loading system of claim 9, wherein the data bus is realized in the form of a CAN bus.

11. The cargo loading system of claim 1, wherein the control unit is realized in the form of a central power supply unit for the power supply of the power drive unit.

12. A means of transport with a cargo loading system comprising:
a power drive unit for moving cargo in a cargo hold of a means of transport;
a portable operational control unit;
a control unit for controlling the power drive unit;
a loading unit for configuring the portable operational control unit;
wherein the portable operational control unit is configured for being coupled to the loading unit;
wherein the portable operational control unit is adapted for being configured for use in different means of transport;
wherein the loading unit is configured for sending information about an operating area for which the portable operational control unit is responsible to the portable operational control unit when the portable operational control unit is coupled to the loading unit to configure the portable operational control unit for the means of transport;
wherein the portable operational control unit is configured to control the entire movement of the cargo by the power drive unit; and
wherein the portable operational control unit is configured to wirelessly transmit commands for controlling the power drive unit to the control unit.

13. The means of transport of claim 12, wherein the means of transport is an aircraft.

14. A method for loading a cargo hold of a means of transport with cargo, with the method comprising:
coupling a operational control unit to a loading unit of the means of transport;
sending information regarding an operating area for which the operational control unit is responsible from the loading unit to the operational control unit and thereby configuring the operational control unit for the means of transport;
controlling, by the operational control unit, the power drive unit for moving the cargo, thereby controlling the entire movement of the cargo in the cargo hold of the means of transport; and
wirelessly transmitting commands for controlling the power drive unit to a control unit by the operational control unit;
wherein the operational control unit is adapted for being configured for use in different means of transport.

\* \* \* \* \*